July 22, 1947.  D. S. ORLANDO  2,424,252
BOX DUMPING MACHINE
Filed March 20, 1945   3 Sheets-Sheet 1
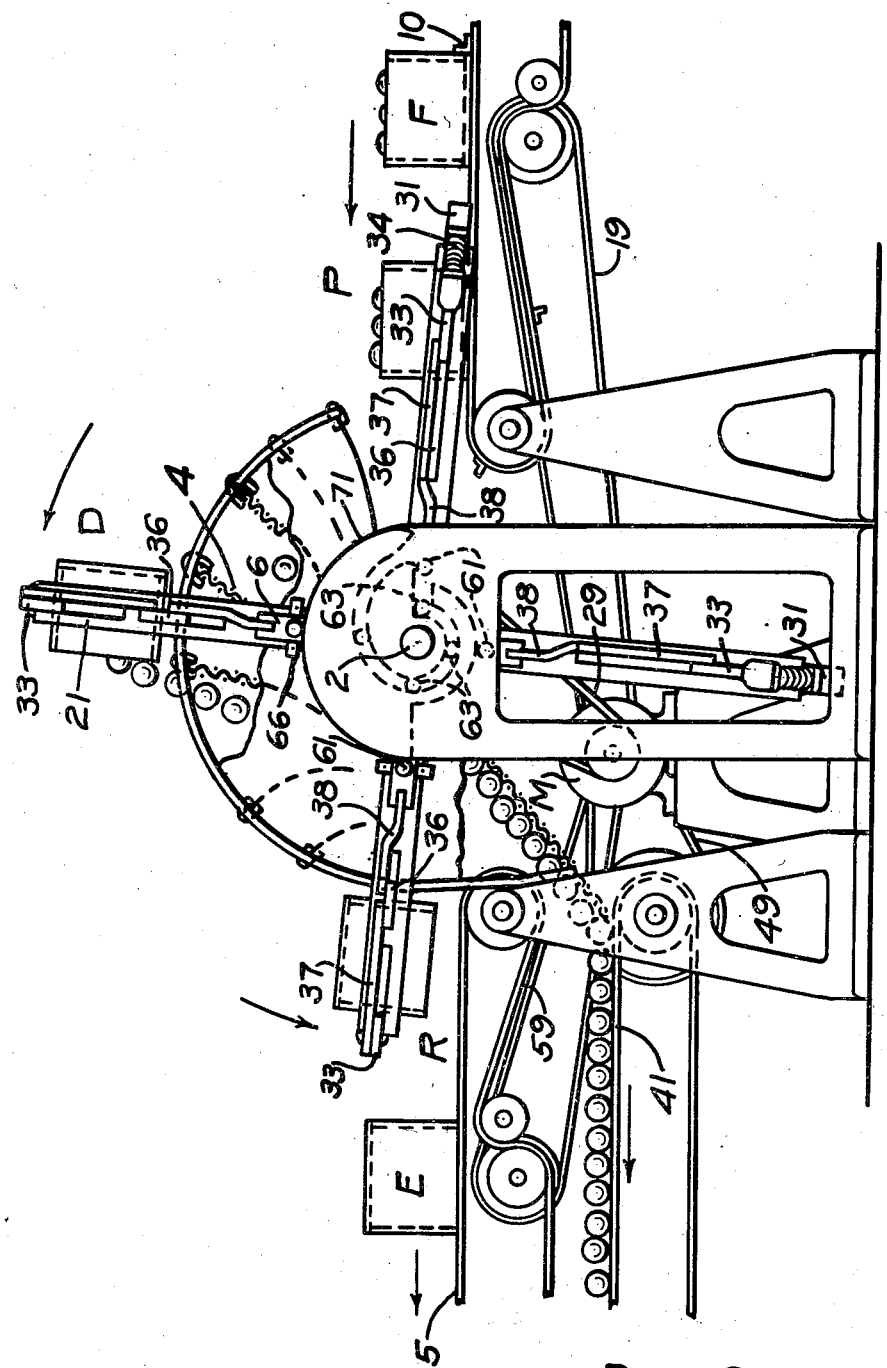
FIG_1
Inventor
DON S. ORLANDO
By Reynolds & Beach
Attorneys

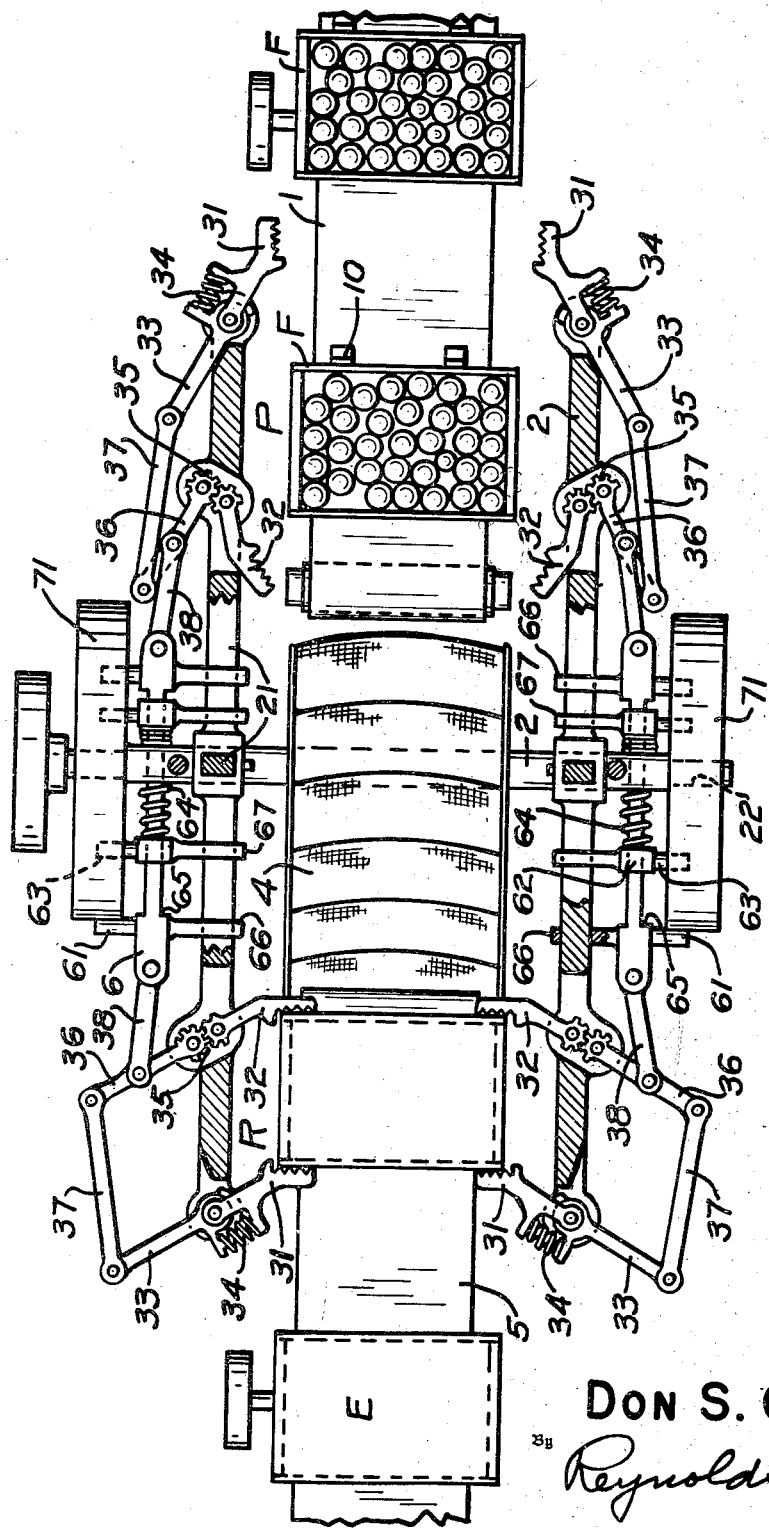

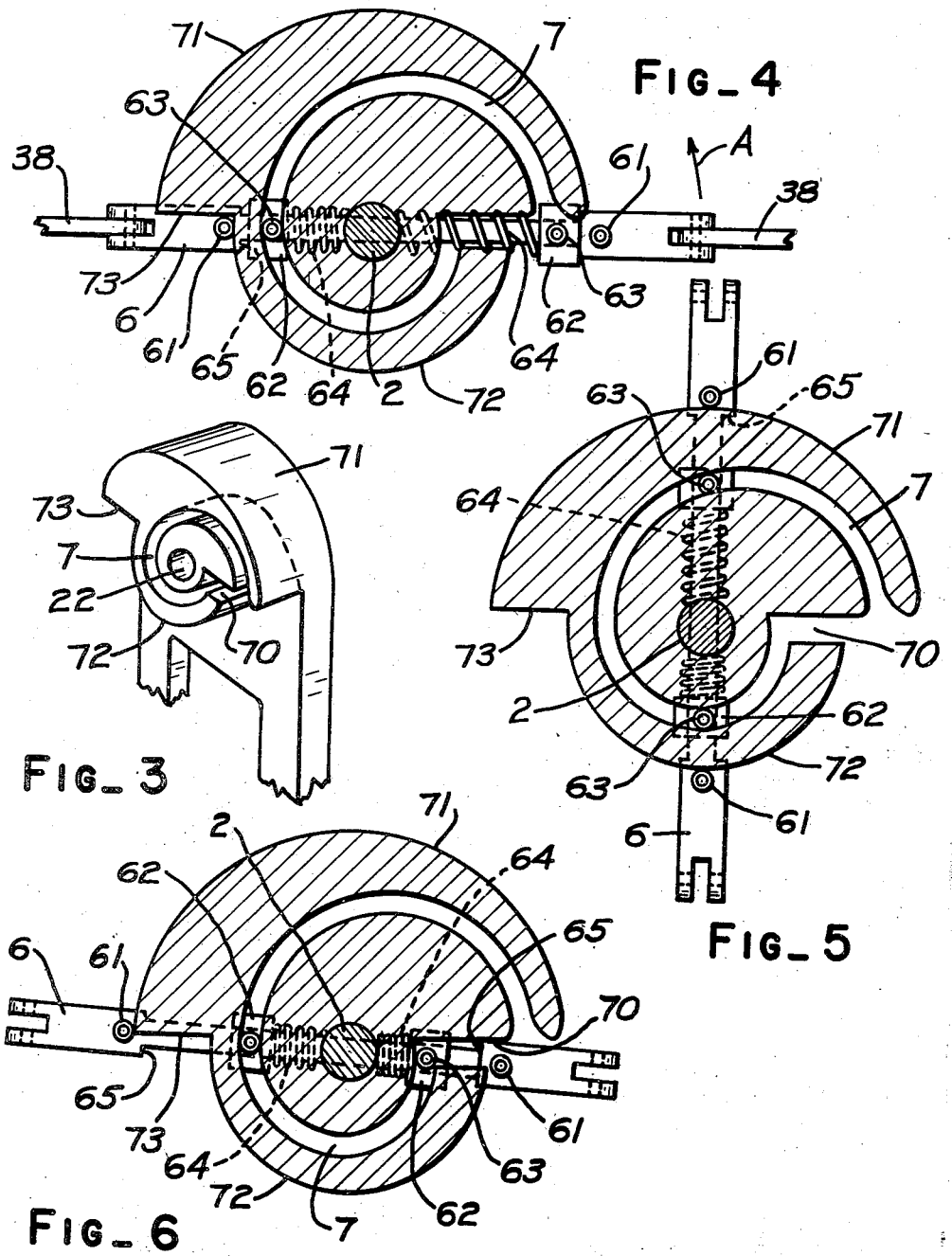

Patented July 22, 1947

2,424,252

UNITED STATES PATENT OFFICE 2,424,252

BOX DUMPING MACHINE

Don S. Orlando, San Jose, Calif.

Application March 20, 1945, Serial No. 583,775

18 Claims. (Cl. 214—1.1)

The present invention relates to the handling of commodities in boxes. It is particularly directed to the receiving and emptying of field boxes filled with fruit or similar commodity preparatory to further treatment of the fruit and the return of the emptied boxes for storage or further use.

In the handling of citrus fruits in particular, and in the handling of other fruits or commodities, the fruit or similar commodity is brought to the processing plant loosely received in field boxes, and these boxes are generally stacked several deep. Mechanism is provided for handling the boxes in such stacks, and the next step in the handling of the fruit is to deliver it to a processing line, in which may be such devices as washers, sorters, graders, and the like. To this end it must be dumped from the boxes. Moreover the empty boxes are often required for immediate re-use and should not be kept full of fruit, and in any event when emptied should be returned to storage if not for immediate re-use.

Mechanism has been provided heretofore for elevating the filled boxes or otherwise delivering them so that they arrive one by one at a dumping point, and then for effecting the tilting or dumping of the boxes to deliver the fruit into a channel for further processing and to deliver the empty boxes to a conveyor for disposal. Mechanism capable of elevating the boxes without breaking the stacks, and arranged so that as each topmost box of a stack arrives at the dumping point it is removed from the stack and dumped, is illustrated in the patent to Parker, No. 1,210,096 issued December 26, 1916, and so far as the stack elevator is concerned this or any other suitable construction may be employed in conjunction with my box dumping machine.

The boxes are usually so filled that some fruit protrudes above the rim of the box, and any arrangement which involves lateral movement of the topmost box or any portion thereof, relative to the box immediately beneath it, is liable to damage the fruit in the latter. This is particularly true of fruit which is easily bruised, or having skin which is easily broken, yet such fruit must be handled rapidly, in large volume. On the other hand, since the boxes must rest each directly upon the box below, with only a narrow end cleat spacing them, it is not practicable to insert lifters beneath each individual box to lift it off the stack. I have found that the only practicable way of removing the box from the stack is to grip it exteriorly, as by its vertical walls or corners. By so doing the box is lifted substantially vertically clear of the stack, avoiding the possibility of fruit injury, and the box is retained immovable relative to the dumper, and is gradually tilted until it is empty.

Mechanisms for gripping and elevating, and then dumping the boxes are known, as in patent to Thompson and Butler, No. 1,926,318, issued September 12, 1933, but it is an object of this invention to provide improved mechanism to this end, one which is more rugged and reliable than such mechanisms heretofore known, simpler in construction and operation, and flexible to accommodate boxes slightly varying in size.

More specifically, it is one of the objects of this invention to provide mechanism which will positively and firmly grip a box filled with fruit at its four vertical corners, elevate it, and in the process tilt it to deliver the fruit to a chute below, and finally to release the grip upon the box and to deposit it upon a receiver, conveyor, or the like.

In the accompanying drawings I have shown my invention in a simplified form, illustrating the principles involved, and in a form which is to be understood as illustrative and not necessarily to be considered as the best practicable or commercial form. It will be understood that changes may be made in the form, character, and arrangement of the parts without departing from the spirit of my invention, as hereinafter described and defined.

Figure 1 is a side elevation of my machine in operation, and Figure 2 is a plan view of the same with certain parts broken away.

Figure 3 is an isometric view of the cam mechanism which controls the operation, shown in an illustrative form.

Figures 4, 5, and 6 are elevations of the cam mechanism and associated parts, with the cam shown in section, and illustrating a cycle of operation through a half revolution.

The operation of the machine contemplates, in brief outline, that the boxes of fruit will arrive individually at a pick-up station or point, will there be gripped and engaged by members which are rotative with their support about a fixed axis which is at one side of the pick-up point, to elevate each individual box; in this rotation the gripping means and the box carried thereby will be inverted in the course of a half revolution. As the box is thus gradually tilted, the fruit spills out into a hopper or chute, located above the rotative axis and in all points closely beneath the box; and finally the empty box in inverted position is released by the gripping means at a releasing point. Meanwhile, other similar gripping means upon the same or a similar support, angularly spaced from the first, have engaged succeeding boxes as they arrive at the pick-up point, and have carried at least one, or more, of them through the dumping point on the way to the releasing point.

It is quite immaterial to the dumping operation how the boxes arrive at the pick-up point. These boxes might be delivered singly by means of a horizontal conveyor, and for simplicity of illustration have been so shown, but it should be kept in mind that they may be delivered to the pick-up point as elements of a vertical stack, the stack being elevated at a rate which will bring a fresh box into position to be gripped by the next such gripping members as the latter arrive at the pick-up point. Since stack elevators to this end are known in the art, as has already been indicated, it will be evident that such stack elevators, though not herein illustrated, might be substituted for the horizontal box conveyor means herein illustrated. The primary desideratum is that the boxes arrive successively at the pick-up point at the time the next set of gripping members arrives there, and that the mechanism be so synchronized as to effect this result. The synchronizing mechanism shown, in the form of a common drive means, is intended to typify any convenient means to this end.

The conveyor 1, having regularly spaced cleats 10, typifies a convenient means for advancing filled boxes F in regular succession to the pick-up point P. At one side of the pick-up point is a rotative shaft 2 which supports and causes rotation of a support, consisting, in the form shown, of radially directed arms 21, each of which carries gripping means, cooperating with fixed cams to effect the gripping and release of a box, such as will be later described in detail. Generally above the shaft 2 is a chute 4 to receive the fruit at the dumping point D as each box is in process of being inverted. The chute is subdivided so that no fruit falls freely any appreciable distance, notwithstanding that the box is elevated well above the pick-up point. As the chute conveys the dumped fruit to a hopper or conveyor 41, by means of which it is transported to a point where its processing commences, the empty boxes are carried to a releasing point R, substantially diametrically opposite the pick-up point P. There the boxes are delivered to a suitable support, shown in the present instance as a conveyor 5 above the conveyor 41, by which means the boxes, in inverted condition, are conveyed away to be restacked or for re-use.

The nature of the box-gripping means is best seen in Figure 2. An outer jaw 31 and an inner jaw 32 are pivoted upon each supporting arm 21, and constitute a pair of oppositely swinging levers or jaws which are opened and closed by the same mechanism. One such pair of jaws, therefore, engages the corners of a box at one end, and a second such pair of jaws, constituting with the first pair a series of four, is similarly supported, and similarly and simultaneously operated, at the opposite end of the box. The supports 21 at the two sides and the jaws are spaced apart far enough to permit the box to enter between them, and then swing inwardly and together to grip the four corners of the box. A similar series of four jaws is supported diametrically opposite, upon the ends of the oppositely directed supporting arm 21, as is seen in Figure 2. The jaws of this complemental set are oppositely operable, that is to say, when the one series of jaws is open, the jaws of the diametrically opposite series are closed in box-gripping position, and vice versa.

To effect the movements of the jaws as described, jaw 31 is provided in effect with an extension 33, although to provide yieldability in spacing between jaws 31 and 32 of a pair, the jaw 31 and its arm 33 are separately formed and are urged apart against stop means by a compression spring 34. The jaw 32 and a complemental arm 36 are each formed with meshing gear teeth 35. The outer ends of the arms 33 and 36 are joined by a link 37, and a link 38 joins the arms 36 with a reciprocable rod 6. In effect the rod 6 is disposed radially of the shaft 2, and may be guided in transverse holes through the shaft for reciprocation. Each such rod controls a pair of jaws at one end of the support 21, and a complemental pair at the other end, these four jaws constituting a set of four, as distinguished from the series of two opposite pairs for gripping a box in common.

Various means may be provided to effect reciprocation of the rod 6, and hence opening or closing of the jaws, at the proper time. As a suitable means to this end, each rod 6 is provided with a cam follower 61 at each end which is fixed upon the rod. Upon a collar 62, slidable lengthwise of the rod, inwardly of the cam follower 61, is mounted a cam follower 63. Compression springs 64 reacting between the shaft 2 and the collar 62 tend to hold the collar outwardly extended, its outward movement causing it to engage a stop shoulder 65 upon the rod 6.

The movement of the rod 6 and consequently of the jaws at its two ends is controlled by fixed cam means disposed about the axis of the shaft 2. A cam 7 is formed with a decreasing radius, in the direction of rotation as shown by the arrow A in Figure 4. The decrease in radius in the cam 7 may occur throughout one complete revolution, or the maximum decrease in radius may take place throughout a lesser part of a complete revolution. Its points of maximum and minimum radius are joined by an abrupt straight radial portion 70 (see Figures 3 and 5). In addition, there is a cam 71 of constant radius and a portion 72 likewise of constant radius, but of less radius than the portion 71. Each of the portions 71 and 72 is of approximately the extent of one-half revolution, and these two portions, opposite the connection 70, are joined by an abrupt radial shoulder 73. Centrally of these cams the shaft 2 may be journaled, as indicated at 22.

Considering the right-hand end of the rod 6 in Figure 4, the rod-mounted follower 61 is about to enter upon the larger concentric portion 71 of the fixed cam, and the collar-mounted follower 63 is about to enter the decreasing portion 7 of the cam. At the left-hand end, the follower 63 is riding within the cam 7 and the follower 61 has just left the larger concentric portion 71 and is beginning to travel over the smaller concentric portion 72. Figure 5 shows the parts after about 90° rotation. By reason of the engagement of the followers 61 with the respective concentric portions of the cam, reciprocation of the rod 6 is prohibited; however, the followers 62, both riding in the cam 7 of decreasing radius, are causing continued and increasing compression of their respective springs 64, between collars 62 and the shaft 2. This position corresponds to the positions of parts as shown in Figure 1. The set of gripping jaws which engage the box carried by the nearly vertical arm 21 at the dumping point D holds this box securely during the rotation of the supporting arms, so that in a half revolution the box is inverted and dumped.

Figure 6 shows the parts with a half revolution almost completed, and immediately prior to the reverse lengthwise movement of the rod 6. The follower 61 at the left is about to pass off the larger concentric cam 71, so that by its movement along the radial portion 73 the reciprocation of the rod 6 may be permitted. This reciprocation is accomplished as soon as the follower 63 at the right passes into the radial portion 70 of the inner cam, freeing the force which has been stored in its spring 64 so that the spring, upon expanding, will cause the collar 62 at the right to engage the shoulder 65 at the right, and thereby to move the rod 6 to the right. The parts then assume the position of Figure 4. Reciprocation of the rod thus caused, effects release of the now inverted empty box at the release point R (Figure 1) and at the same time effects closing of the gripping jaws upon a filled box at the pick-up point P.

Since the action of the cams upon the respective cam-followers will produce a torque upon the rod 6 and the collar 62 respectively, tending to rotate them about the longitudinal axis of the rod, means must be provided to counteract this tendency. While any suitable means will serve, guides 66 and 67 have been shown, connected to the rod 6 and collar 62 respectively, and embracing and sliding lengthwise of the parallel supporting arm 21.

The drive mechanism, illustrated in Figure 1, is merely intended to be suggestive of a suitable drive from a motor M to the several driven elements, respectively, the drive 19 to the delivery belt 1 or other filled box conveyor, the drive 29 to the shaft 2 and the supporting arms 21, and the drive 59 to the off-bearing empty box conveyor 5. These should all be synchronized. A similar drive 49 may also be provided for the fruit belt 41, or the latter may be independently driven, since it is not necessarily synchronized with the other devices.

It is believed that it will now be clear how each box, as it arrives at the pick-up point P, is gripped by a series of jaws, is lifted directly off its support, is carried over and through the dumping point D, and is finally released and deposited at the releasing point R, simultaneously as a following box, having arrived at the pick-up point, is gripped. In the meantime one or more intervening boxes have arrived at the pick-up point, and have been gripped and lifted. Only four supporting arms 21 have been shown, but six, or other even number, may be provided. The grippers of each arm move faster than the boxes are elevated, if a stack elevator is used, but by proper synchronization each box is gripped and lifted clear as it arrives at the pick-up point. Should there be no box awaiting a series of grippers, they will close, but no harm results.

The entire mechanism is simple and positive, and is mechanically operated; it does not need to rely for operation upon trips, relays, or other power means, as compressed air.

I claim as my invention:

1. In combination with a chute to receive fruit, located at one side of a pick-up station whereto filled fruit boxes are delivered; a plurality of gripper means angularly spaced and rotative about an axis disposed generally beneath the chute, and through an endless path including in succession said pick-up station, a dumping point above the chute, and a release point beyond the chute, and return to the pick-up station; each gripper means including two pairs of jaws, of which one pair is disposed to engage the front and rear sides at one end of the box, and the second pair is disposed to similarly engage at the other end of the box; and means controlling said gripper means to grip a filled box at the pick-up station, to retain it thus gripped as it rotates through successively tilted positions past the dumping point, and to release it upon reaching the release point.

2. The combination of claim 1, and means to synchronize the delivery of a further filled box at the pick-up station with the arrival there and the gripping of one of said gripper means.

3. In combination with a chute to receive fruit, located at one side of a pick-up point whereto filled boxes are delivered; two rotatively mounted supports spaced axially sufficiently to receive the length of a box therebetween; a series of pairs of gripper jaws spaced angularly about one such support, the jaws of each pair being spaced radially sufficiently to receive the width of one end of a box therebetween; a second series of similarly arranged pairs of gripper jaws carried by the second such support to receive the width of the other end of a box therebetween; and means controlling each two complemental pairs of jaws during rotation of the supports, automatically to grip a box adjacent its four corners and thus to fix it relative to the supports, to retain it thus fixed as it rotates through successively tilted positions past a dumping point above the chute, and to release it, inverted, at a release point located generally diametrically opposite the pick-up point.

4. The combination of claim 3, including means yieldable in each pair of gripper jaws to accommodate boxes of a width in excess of a minimum to which the jaws are closed.

5. The combination of claim 3, wherein the jaw-controlling means is formed as a fixed cam disposed about the rotative axis, and cam follower means operatively connected to the jaws and rotative with the support.

6. In combination with a chute to receive fruit, located at one side of a pick-up point whereto filled boxes are delivered; a series of radial arms angularly spaced and rotative about an axis disposed generally beneath the chute; a paired series of arms spaced axially of the first series sufficiently to admit the length of a box therebetween; a pair of gripper jaws mounted upon the outer end of each arm, spaced apart sufficiently to admit the width of a box between them; and means controlling said gripper jaws automatically during rotation of the arms, to grip a box adjacent its four vertical corners at the pick-up point, and thus to lift the box bodily; to fix it thus relative to the arms as it rotates through successively tilted positions past a dumping point above the chute; and to release it, inverted, at a release point located generally diametrically opposite the pick-up point.

7. The combination of claim 6, wherein the jaw-controlling means includes a generally radially disposed rod projecting at each side of the rotative axis and operatively connected to two diametrically opposite pairs of jaws, and fixed means to shift said rod in the direction of its length upon completion of each half-revolution, to effect opposite action of each of the pairs of jaws controlled thereby.

8. The combination of claim 6, wherein the jaw-controlling means includes a generally radially disposed rod projecting at each side of the rotative axis and operatively connected to two diametrically opposite pairs of jaws, a fixed cam surrounding the rotative axis and cam followers carried by the rod, said cam and cam followers being organized and arranged to shift said rod in the direction of its length upon completion of each half-revolution, to effect closing of that pair of jaws which is at the pick-up point and simultaneous opening of that pair of jaws which is at the release point.

9. The combination of claim 6, wherein the jaws of each pair are formed, one as a lever pivoted between its ends upon the outer end of its supporting radial arm, and the other as a lever pivoted at its end inwardly upon the radial arm, and toothed concentrically of its pivot axis; and wherein the jaw-controlling means includes a reversing lever pivoted upon the radial arm adjacent the inner jaw and toothed concentrically of its pivot axis to mesh with the teeth of the jaw, a link connecting the reversing lever and the end of the first jaw lever, a reciprocable rod disposed generally radially and operatively connected to said linked levers, and means to effect opposite reciprocation of the rod following each half-revolution of the arms.

10. In combination with a chute to receive fruit, located at one side of a pick-up point whereto filled boxes are delivered; a pair of supports rotative about and spaced axially along a generally horizontal axis, their spacing being sufficient to receive the length of a box therebetween; a pair of gripper jaws carried upon one of said supports, and spaced apart in a radial direction sufficiently to receive the width of a box therebetween; a similar pair of jaws mounted upon the second of said supports opposite the first pair, and constituting therewith a box-gripping set of four; similarly constituted and arranged sets angularly spaced about the supports, in complemental sets diametrically disposed; a reciprocable rod generally radially disposed between and rotative with such complemental sets, and operatively connected to each to effect gripping by one set and simultaneous release by the other set upon movement of the rod in a given sense; and means to effect such reciprocation of the rod with each half-revolution of the support.

11. In combination with a chute to receive fruit, located at one side of a pick-up point whereto filled boxes are delivered; a pair of supports rotative about and spaced axially along an axis disposed generally beneath the chute and level with the pick-up point, their spacing being sufficient to receive the length of a box therebetween; a pair of gripper jaws carried upon one of said supports, and spaced apart in a radial direction sufficiently to receive the width of a box therebetween; a similar pair of jaws mounted upon the second of said supports opposite the first pair, and constituting therewith a box-gripping set of four; similarly constituted and arranged sets angularly spaced about the supports, in complemental sets diametrically disposed; a reciprocable rod generally radially disposed between and rotative with such complemental sets, and operatively connected to each to effect gripping by one set and simultaneous release by the other set upon movement of the rod in a given sense; and power storage means regenerative with each half-revolution of the support, and releasable at the end thereof to effect such reciprocation of the rod.

12. In combination with a chute to receive fruit, located at one side of a pick-up point whereto filled boxes are delivered; a pair of supports rotative about and spaced axially along an axis disposed generally beneath the chute and level with the pick-up point, their spacing being sufficient to receive the length of a box therebetween; a pair of gripper jaws carried upon one of said supports, and spaced apart in a radial direction sufficiently to receive the width of a box therebetween; a similar pair of jaws mounted upon the second of said supports opposite the first pair, and constituting therewith a box-gripping set of four; similarly constituted and arranged sets angularly spaced about the supports, in complemental sets diametrically disposed; a reciprocable rod generally radially disposed between and rotative with such complemental sets, and operatively connected to each to effect gripping by one set and simultaneous release by the other set upon movement of the rod in a given sense; and power storage means regenerative with each half-revolution of the support, and releasable at the end thereof to effect such reciprocation of the rod and means to positively retain the rod, and consequently the jaws, in the thus-reciprocated position during the ensuing half-revolution.

13. The combination of claim 10, wherein the means to effect reciprocation of the rod includes cam means disposed about the rotative axis, and cam follower means upon the rod, the cam and cam follower means being arranged and organized to retain the rod at one limit of its reciprocation during a half revolution, then to permit its reciprocation, and then to permit its reciprocation in the opposite sense, and power means operable automatically upon the completion of each half revolution, to effect reciprocation of the rod upon its release by said cam means.

14. The combination of claim 10, wherein the means to effect reciprocation of the rod includes cam means disposed about the rotative axis, and cam follower means upon the rod, the cam and cam follower means being arranged and organized to retain the rod at one limit of its reciprocation during a half revolution, then to permit its reciprocation, and then to permit its reciprocation in the opposite sense, and means to store up a force, acting upon the rod in the direction of its length, during each half revolution, to effect its reciprocation upon release by said cam means.

15. The combination of claim 10, wherein the means to effect reciprocation of the rod includes a first fixed cam having a decreasing radial departure from the rotative axis in the course of a revolution, and a connecting generally radial portion between the portions of greatest and last radial departure, to define a closed path, a second fixed cam having two portions, each of constant but different radius throughout two half revolutions, a pair of cam followers fixed upon the rod and engageable with the second cam to retain the rod during its revolution in a given reciprocated position, a pair of collars slidable lengthwise of the respective ends of the rod and having each a cam follower engageable with the first cam, a spring interposed between each collar and an abutment fixed relative to the shaft, to be compressed during traverse of the latter cam follower over the first cam, and a stop on the rod, engageable by the collar upon release of its spring's force, to effect reciprocation of the rod, upon arrival of the cam followers at the generally radial portions of the cams.

16. A box dumping device comprising a support, a pair of box-gripping members arranged on said support to engage its opposite sides at one end of a box, and further box-engaging members on said support to engage the box's opposite end, means to move said supports and said box-gripping and box-engaging member through a closed path which is directed generally upwardly at a pick-up station, and which effects tilting of the box at a dumping station, and means operatively connected to said box-gripping members to close them upon a box, and, in conjunction with said box-engaging member, to elevate the box at the pick-up station, and to release such box after passing the dumping station.

17. A box dumping device comprising a support, box-gripping members arranged on said support in sets arranged to engage the four corners of a box, means to move said supports to advance said box-gripping members through a closed path which includes a generally upward portion passing a pick-up station, and a box-inverting portion passing a dumping station, and means operatively connected to said box-gripping members to close them upon a box at the pick-up station, and to release such box beyond the dumping station.

18. A box dumping device comprising a support rotative about a horizontal axis, means carried by and distinct from said support in position to grip and elevate a filled box at a pick-up station at one side of said axis, and to dump such box as it is inverted above said axis by rotation of the support thereabout, control means automatically operable to effect relatively immovable engagement of said gripping means with such box at such pick-up station, and to release such box after dumping its contents, and a chute subdivided by a plurality of inclined partitions each disposed transversely of and spaced lengthwise closely beneath all parts of the dumping portion of the path of the box's support, to intercept the falling fruit.

DON S. ORLANDO.

REFERENCES CITED

The following references are of record in the file of this patent:

UNITED STATES PATENTS

| Number | Name | Date |
|---|---|---|
| 766,515 | Northrup | Aug. 2, 1904 |
| 1,926,318 | Thompson et al. | Sept. 12, 1933 |